United States Patent [19]

McLarty et al.

[11] Patent Number: 4,657,412

[45] Date of Patent: Apr. 14, 1987

[54] VARIABLE PRELOAD BEARING ASSEMBLY

[75] Inventors: Daniel R. McLarty, Burlington; John H. Munson, New Britain, both of Conn.

[73] Assignee: The Torrington Company, Torrington, Conn.

[21] Appl. No.: 715,517

[22] Filed: Mar. 25, 1985

[51] Int. Cl.⁴ .......................... F16C 19/06; F16C 25/08
[52] U.S. Cl. ........................................ 384/447; 384/1; 384/478; 384/517; 384/624
[58] Field of Search ............... 384/517, 540, 447, 448, 384/624, 1; 308/1 A, 1 R

[56] References Cited

U.S. PATENT DOCUMENTS

| 1,377,637 | 5/1921 | Stangland | 384/540 X |
| 2,711,356 | 6/1955 | Ensinger | 384/517 |
| 3,222,991 | 12/1965 | Bone | 409/231 |
| 3,352,611 | 11/1967 | Seidel | 384/461 |
| 3,554,466 | 1/1971 | Paine | 308/1 R |
| 4,400,098 | 8/1983 | Lacey et al. | 384/99 |
| 4,466,503 | 8/1984 | Hans et al. | 180/259 |

FOREIGN PATENT DOCUMENTS

| 50313 | 3/1978 | Japan | 384/448 |
| 196318 | 11/1983 | Japan | 384/448 |
| 1604411 | 12/1981 | United Kingdom . | |
| 2113845 | 8/1983 | United Kingdom . | |
| 544799 | 1/1977 | U.S.S.R. | 384/448 |

Primary Examiner—John M. Jillions
Assistant Examiner—Lynn M. Sohacki
Attorney, Agent, or Firm—Hayes & Reinsmith

[57] ABSTRACT

A bearing assembly for use with a spindle and featuring a rotatable preload actuator having differential thread portions in mesh with threaded sections of a selected race adjustment member to selectively vary the loading of the bearing. Drive means is provided for rotating the preload actuator to control actual bearing load.

10 Claims, 4 Drawing Figures

VARIABLE PRELOAD BEARING ASSEMBLY

FIELD OF THE INVENTION

This invention generally relates to bearing assemblies and particularly concerns bearing assemblies usable with spindles of machine tools and capable of subjecting a bearing to a variable preload force and having an associated control for varying and monitoring that preload force.

BACKGROUND OF THE INVENTION

In known bearing assemblies for machine tools, the bearings are subjected to dynamic axial and radial loading forces. It is generally desirable to provide variable loading forces, hereinafter called "preloading", to control stiffness of the bearings in machine tool spindles, such as lathe and milling machine spindles, adapted to hold cutting tools or work pieces.

More specifically, axial loading of bearings (such as an anti-friction ball bearing of an angular-contact variety or a tapered roller bearing) consists of axially biasing one race, such as the outer race, relative to the inner race. When this is done, e.g., in a ball bearing, a force is transmitted from that outer race to the balls and from the balls to the inner race. These forces tend to hold the balls tightly between the races. The greater the axial loading, the more tightly the balls are held. The outer race is tightly secured in a bushing or housing and the inner race is tightly secured on the spindle. Thus, the more tightly the balls are held between races, the more rigidly the spindle is mounted in the housing. At the same time, however, the more tightly the balls are held between races, the more likely it is that the useful life of the bearings may be decreased if the preload forces are excessive.

Cutting loads frequently vary rapidly during maching operations, causing torque load and deflection forces acting on the spindle to vary accordingly. Any looseness in such an environment will cause a loss of accuracy due to excessive ranges of cutter deflection, machine vibration and spindle chatter. Preloading minimizes shake and chatter and reduced deflection during use of the spindles by causing them to be more rigidly held. Preloading also has certain adverse effects. Friction forces in preloaded spindles can increase with preload, and in a spindle which must be operated at high speed, excessive heat normally is generated unless the preload is low in magnitude. Moreover, high operating temperatures and internal forces also may create unpredictable thermal loading detrimental to machine accuracy and bearing life.

SUMMARY OF THE INVENTION

To provide an accurate initial preload and also compensate for the above described effects of speed and temperature changes, in addition to effecting desired stiffness in both radial and axial directions, this invention features a preload actuator or rotary coupling having differential thread portions meshingly engaging corresponding threaded sections of different pitch on outer race adjustment members to apply a variable axial force to outer races of the bearings. To vary that axial force, or preload, a bearing loading adjustment control is provided with a sensing device for activating the control which varies the bearing preload to a specified level in an exceptionally quick and easy manner.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principle of this invention is employed.

DETAILED DESCRIPTION OF PREFERRED EMBODIMENTS

Figure 1:
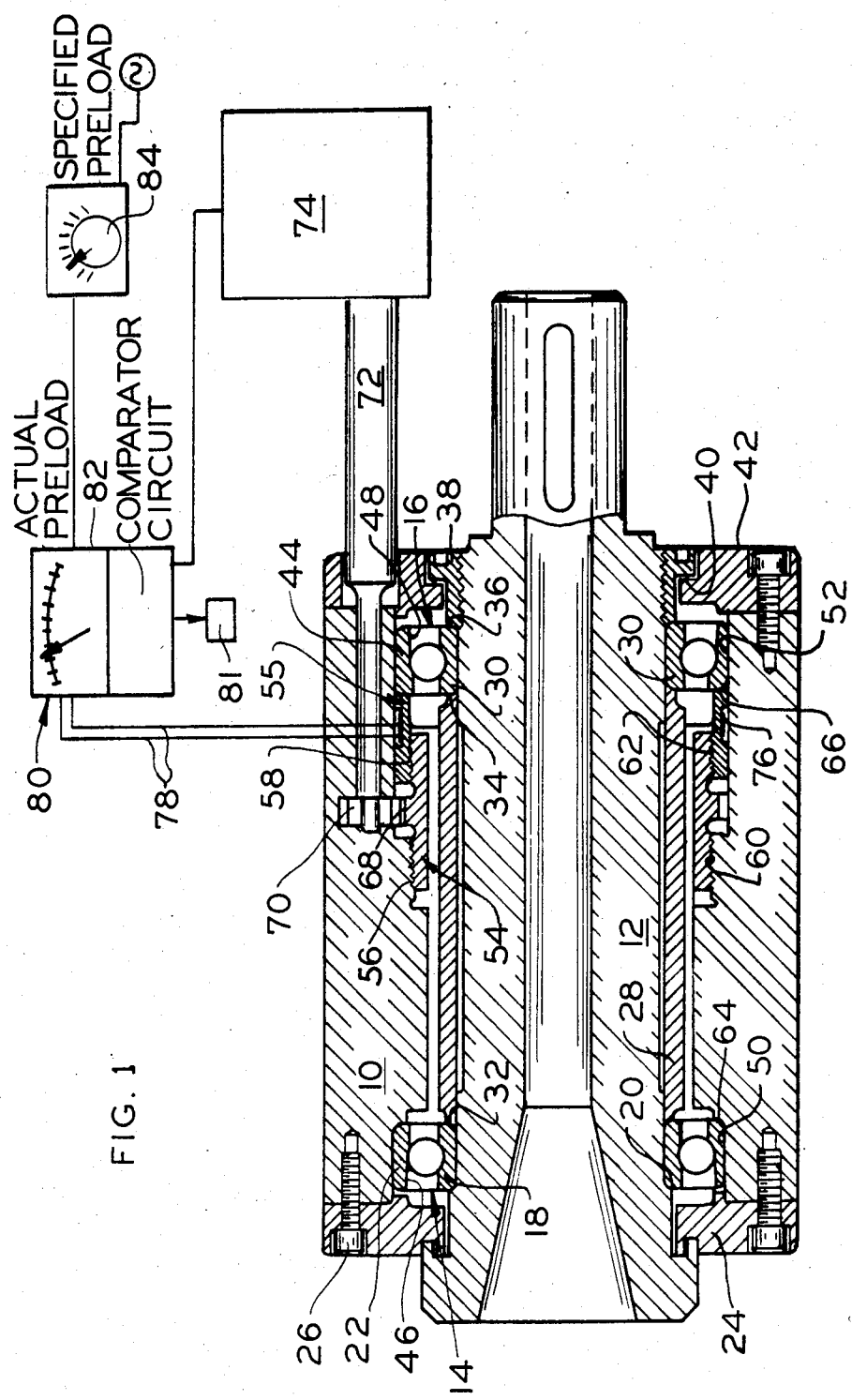
FIG. 1 is a side view, partly in section and partly broken away, showing an assembly of this invention, including a schematic electrical control diagram.

Referring now to the drawings in detail, FIG. 1 shows a bushing 10 in coaxially aligned surrounding relation to a spindle 12 of a machine tool, not shown. Spindle 12 is adapted to receive different type tools some of which may be rotated at a slow speed to take a heavy cut, such as a milling cut, and some of which may be rotated at a high speed to take a light cut, such as a drilling cut.

Spindle 12 is shown received in two ball bearings indicated generally at 14 and 16. Bearing 14 is shown having its inner race 18 abutting shoulder 20 of spindle 12 and its outer race 22 in spaced relation to annular end cover 24 secured to bushing 10 by fasteners such as the bolt illustrated at 26. Minimum spacing between bearings 14 and 16 is maintained by a tubular spacer 28 coaxially fixed to spindle 12 between inner races 18 and 30 of bearings 14 and 16 in engagement with their inboard axial ends 32 and 34. An outboard axial end 36 of inner race 30 of bearing 16 is fixed in position against a shoulder of a retaining collar 38 threaded onto spindle 12. End cover 42 is secured by fasteners to bushing 10. Collar 38 in turn maintains the inner race 18, 30 of each bearing 14, 16 in fixed relation to spindle 12.

Each of the outer races 22, 44 of bearings 14, 16 is of a typical angular-contact variety. Bores 50 and 52 of bushing 10 are adapted to receive and locate the outer cylindrical surface of each of the outer races 22 and 44.

To preload ball bearings 14, 16 in accordance with a feature of this invention, a preload actuator or rotary coupling 54 and a sleeve 55 are shown coaxially mounted relative to spindle 12 within bushing 10, and coupling 54 is provided with differential thread portions 56, 58 axially spaced apart and formed on outer peripheral surfaces of coupling 54. Bushing 10 and sleeve 55 are respectively formed with threaded sections 60 and 62 on internal surfaces with those threaded sections respectively having different pitches corresponding to threaded portions 56 and 58 of rotary coupling 54. The pitch of threaded portion/section 58, 62, for example, may be greater than the pitch of threaded portion/section 56, 60, with the pitches being understood to be in the same angular sense.

More specifically, the pitches of the threaded sections 60, 62 and threaded portions 56, 58 are in the same angular direction. The differential thread, for example, may be provided by different threaded sections, say, of 16 and 14 threads per inch, whereby the effective lead of the system then is the difference between 1/14–1/16 inch equalling 0.00893 inch per revolution. It is also to be understood that bushing 10 and sleeve 55 are each suitably secured by means, not shown, against rotation. This may be accomplished, e.g., by keying sleeve 55 to bushing 10, while permitting axial movement of sleeve 55 relative to bushing 10 which in turn may be fixed to an external mounting housing, not shown.

By virtue of the above described construction, the preload of the two angular-contact ball bearings 14, 16 now may be readily varied by varying the distance between inboard axial ends 64, 66 of bearing outer races 22, 44. An outboard axial end of the sleeve 55 is in confronting abutting contact engagement with inboard axial end 66 of outer race 44 of bearing 16. To adjustably vary preload, rotary coupling 54 is rotated in a given angular direction, and the resulting axial displacement of sleeve 55 within bushing 10 toward bearing 16 causes outer races 22, 44 of bearings 14, 16 to be displaced in opposite directions relative to one another and thus, adjusts or preloads the bearing assembly.

To provide a quick and easy adjustment, rotary coupling 54 includes an integral ring gear 68 formed about its outer peripheral surface between thread portions 56 and 58. In the illustrated preferred embodiment, ring gear 68 is shown in meshing engagement with a pinion 70 fixed on a motor output shaft 72 journalled for rotation in bushing 10 and drivingly connected to motor 74.

In accordance with yet another feature of this invention, strain gauges such as illustrated at 76 are bonded to the non-rotatable sleeve 55 and function as a force sensor or preload sensing device providing an electrical output signal through lead wires 78, 78 to a bearing loading adjustment control 80. This control 80 includes a conventional micro-processor comparator and indicating means (such as meter 82) suitably calibrated for displaying a reading of actual applied bearing loading. Adjustment control 84 with suitable circuitry, provides the adjustable reference voltage that represents desired bearing preload. The output of the comparator circuit is proportional to the difference between the input signal from the preload sensing device 76 and a desired or specified preload; that output is supplied to motor 74 to effect the desired angular rotation to increase or decrease actual bearing preload. Upon match of the actual applied bearing loading to that specified, the comparator circuit has zero output, and a suitable control de-energizes motor 74. When the actual applied bearing loading is equal to the specified loading, no signal is transmitted to motor 74 and no rotation of its drive shaft 72 is effected.

After a preload setting has been made, the motor drive to pinion 70 may be disabled by de-energizing the motor whereupon meter 82 of adjustment control 80 serves as a monitor to continuously provide a read-out of applied bearing loading in real time. It will be understood that any suitable signaling device (such as indicator alarm 81) may be provided in the adjustment control 80 to indicate when a maximum preset bearing loading limit has been exceeded as determined by output from a comparator circuit. In addition, this invention and the described structure contemplates use of the adjustment control 80 to provide a constant preload for a given machine cycle or to program in a desired change in the preload setting on a real time basis, for example, during a long spinning cycle.

Figure 2:
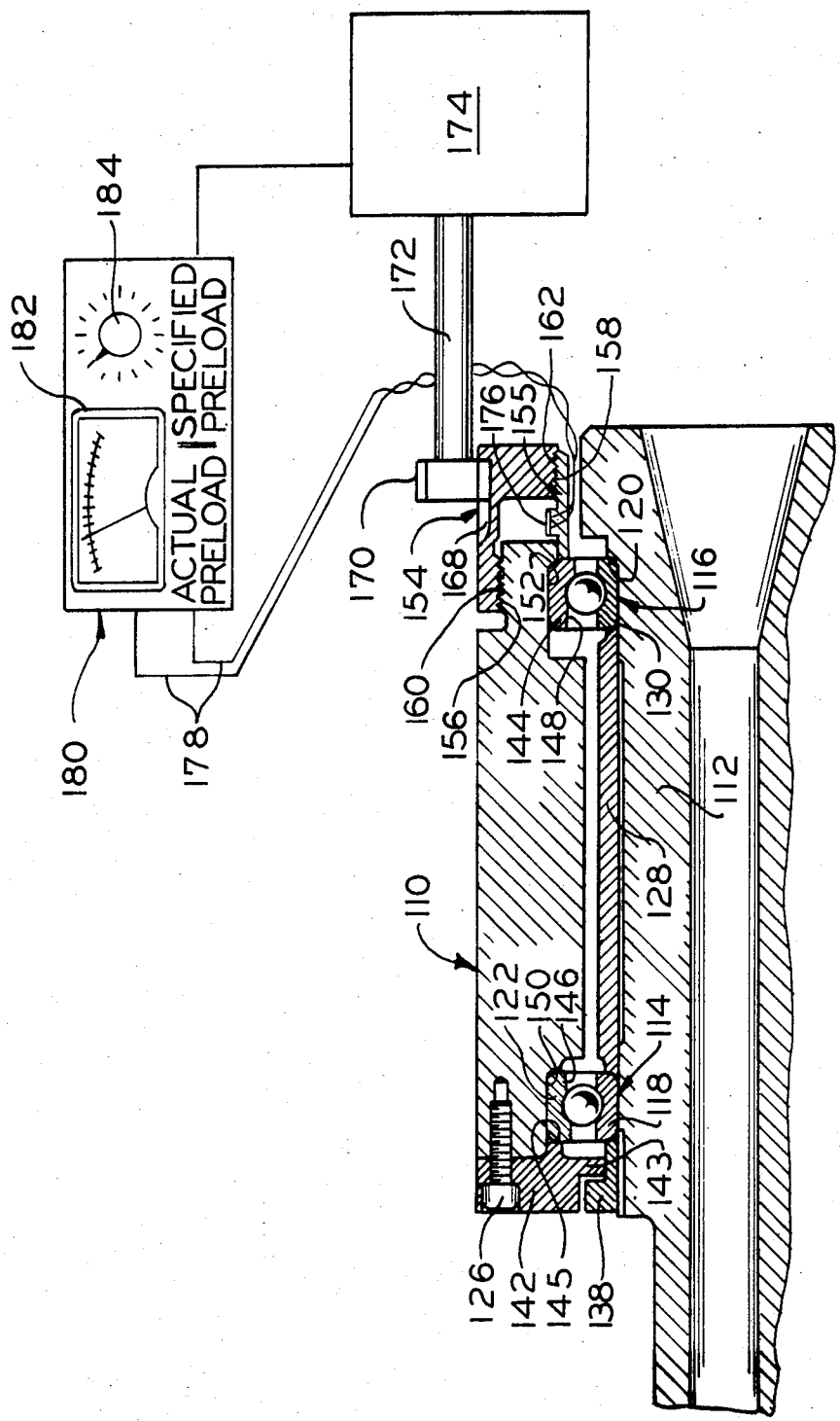
FIG. 2 is a side view, similar to FIG. 1, showing another embodiment of this invention.

Turning now to that embodiment of the invention illustrated in FIG. 2, the bearing contact angle is reversed relative to that illustrated in the first embodiment. Bearings 114, 116 are again shown as being of an angular-contact variety. However, the outer race 122, 144 of each bearing 114, 116 is counterbored at its axial inner end as at 146, 148. Spindle 112 is mounted within a fixed bushing 110, and inner races 118, 130 of bearings 114, 116 are secured in fixed non-rotating relation to spindle 112. Inner race 130 of bearing 116 is sandwiched between an annular spindle shoulder 120 and an axial end of a tubular spacer 128 coaxially fixed about spindle 112. Inner race 118 of bearing 114 is in confronting abutting engagement with an opposite axial end of spacer 128.

In this specifically illustrated embodiment, an annular end cap 142 is shown secured by suitable means such as the illustrated bolt 126, to bushing 110. The latter is of a generally cylindrical shape coaxially mounted with opposite end bores 150, 152 of bushing 110 adapted to receive and locate the outer cylindrical surface of each of the outer races 122, 144 of bearings 114, 116. End cap 142 is illustrated as having a radially inwardly directed flange 143, and a mounting collar 138 is shown threadably secured to spindle 112 for rotation therewith. End cap 142 is also illustrated as having an axially inwardly directed projection 145 engaging an outboard axial end of outer race 122 of bearing 114.

The outboard axial end of outer race 144 of the other bearing 116 is in confronting abutment with an annular sleeve 155 suppoerted in coaxial surrounding relation by rotary coupling 154 relative to the rotational axis of spindle 112. Sleeve 155 has an outer peripheral surface with a threaded section 162, the pitch of which will be understood to be different from the pitch of another threaded section 160 formed on an outer peripheral axial end portion of bushing 110. In the illustrated embodiment, threaded section 160 is shown generally radially aligned with bearing 116. Both bushing 110 and sleeve 155 will be understood to be fixed against rotation by any suitable means, not shown. However, sleeve 155 is axially displaceable in response to rotation of a preload actuator or rotary coupling 154 having spaced internally threaded portions 156 and 158 of differential thread pitch meshingly engaging correspondingly threaded sections 160 and 162 of the bushing 110 and sleeve 155. The differential thread portions 156, 158 of the rotary coupling 154 are radially and axially offset from one another, and thread portion/section 156, 160 will be understood to have a pitch reciprocal of, say, 16 threads per inch in contrast to, say, 14 threads per inch of the thread portion/section 158, 160.

By virtue of the above described construction, upon energization of motor 174 and rotation of its output drive shaft 172 in a given angular direction, rotary coupling 154, which is provided with suitable gear teeth such as at 168 in mesh with pinion 170, will rotate in an opposite angular direction to cause the axially movable sleeve 155 and bushing 110 to be effectively drawn together to apply a specified given preload. Adjustment of that preload is accomplished in a ready and facile manner by the provision of strain gauges 176 which are electrically connected as in the first described embodiment by suitable electrical lead wiring 178, 178 to a bearing loading adjustment control 180. An actual applied preload may be adjusted upwardly or downwardly, as required, upon control 180 comparing the indicated actual preload to that specified as dialed in by an operator by knob 184, thereby to energize motor 174 to rotate its drive shaft 172 in a suitable angular direction to increase or reduce the applied preload until a match is obtained by the display of the indicator meter 182 of control 180 and that specified by its comparator circuit.

If desired, a bearing outer ring displacement sensor can be substituted for strain gauges 76, 176. Such a sensor can provide the desired signal output based upon actual movement of the bearing outer ring because such movement is proportional to bearing preload. The output of such displacement sensor then becomes analogous to the strain gauge output in the illustrated control system.

Figure 3:
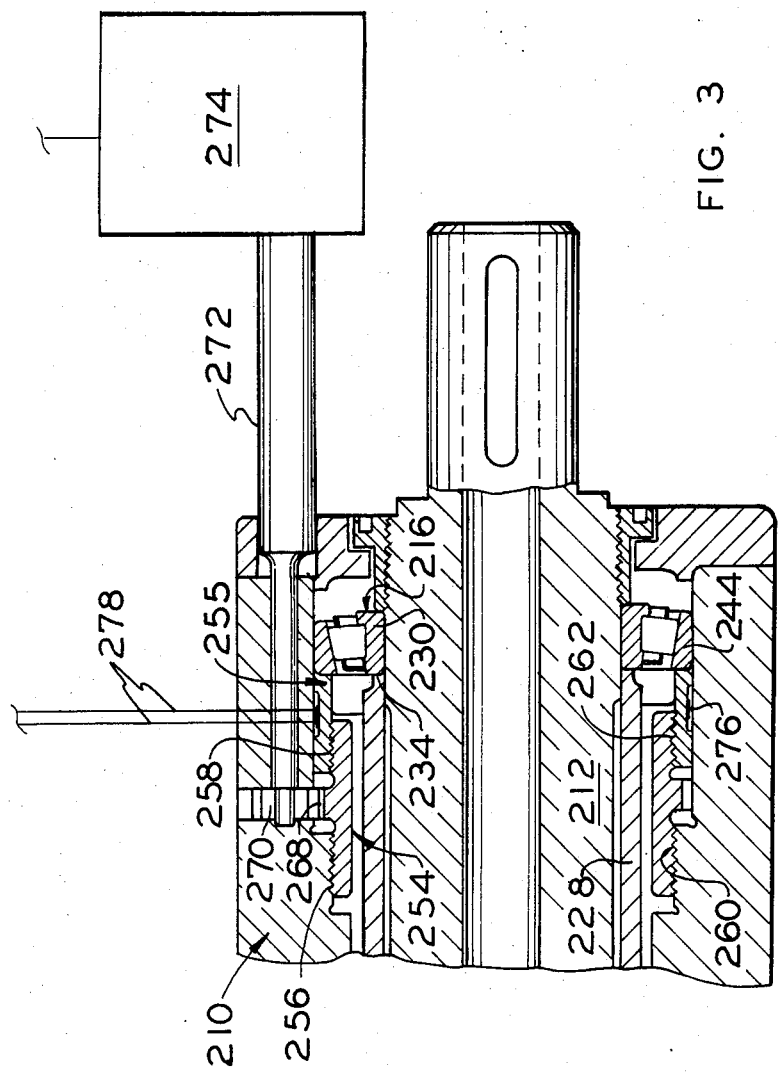
FIG. 3 is a fragmentary side view, similar to FIG. 1 showing yet another embodiment of this invention.

The above described embodiments are associated with angular contact bearings. However, other bearings may be utilized with this invention. FIG. 3 shows yet another embodiment of this invention which is substantially identical to the embodiment of FIG. 1. FIG. 3 shows a variable preload actuator 254 (with differential thread portions 256, 258 in mesh with threaded sections 260 and 262 of bushing 210 and sleeve 255) with sleeve 255 coaxially mounted relative to spindle 212 within bushing 210 to preload a pair of tapered roller bearings such as the one shown at 216. It is to be understood that another tapered roller bearing, not shown, is provided adjacent an opposite end of bushing 210 (such as at the location of bearing 14, FIG. 1). Each roller is angularly disposed, relative to a major axis of spindle 212, axially and radially outwardly toward an outboard end of spindle 212 with a non-rotatable outer race 244 and an inner race 230 mounted for rotation with spindle 212. Minimum spacing is maintained between such tapered roller bearings by tubular spacer 228 fixed to spindle 212 between bearing inner races such as at an inboard axial end 234 of inner race 230.

Ring gear 268 of actuator 254 meshes with pinion 270 of output shaft 272 of motor 274 which may be operated, as described above, by a suitable adjustment control, not shown, connected by lead wires 278, 278 to a suitable preload sensing device such as the illustrated strain gauge 276. As previously described, upon rotating actuator 254 in a given angular direction, sleeve 255 is axially displaced within bushing 210 toward bearing 216 to cause the bearing outer races (such as shown at 244) to be displaced in opposite axial directions relative to one another and thereby preload the bearing assembly.

It will be appreciated that tapered roller bearings of the type illustrated at 216 may also be substituted for bearings 114, 116 of the embodiment of this invention shown in FIG. 2.

Figure 4:
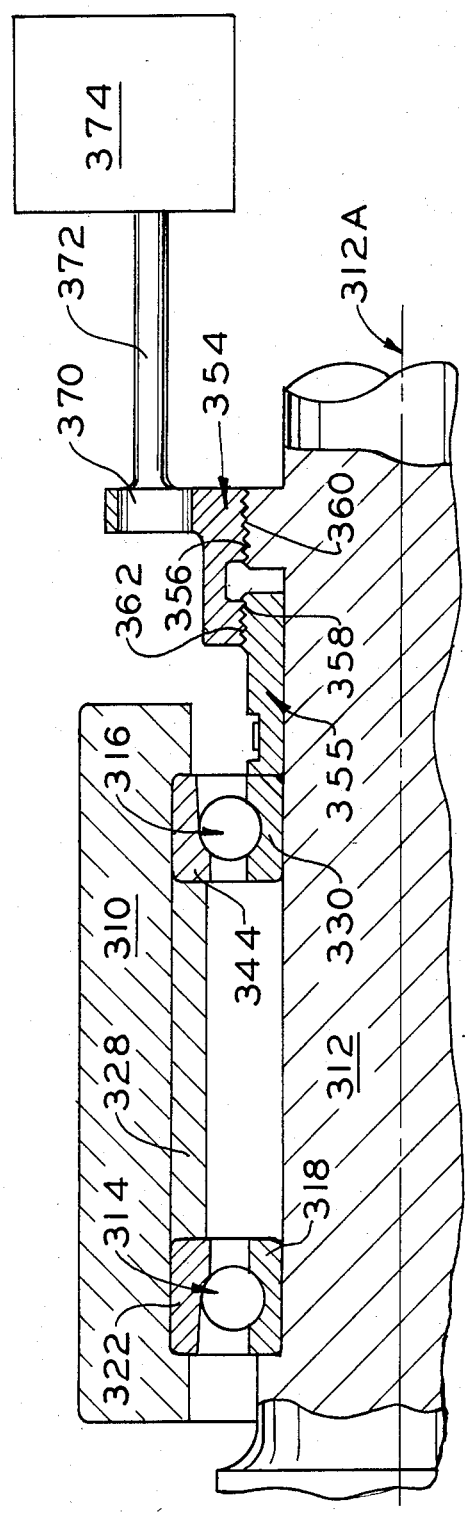
FIG. 4 is a side view, partly in section and partly broken away, showing a further embodiment of this invention.

Turning now to that embodiment of the invention illustrated in FIG. 4, bearing assemblies 314 and 316 (of a typical angular-contact variety) are illustrated at opposite ends of a rotatable bushing 310. In this particular embodiment, bushing 310 is rotatable about a fixed spindle 312 having a longitudinally extending axis 312A. Inner races 318, 330 are illustrated as being in coaxially surrounding relation to spindle 312. Inner race 318 will be understood to be in fixed relation to spindle 312 while inner race 330 is axially movable relative to spindle 312. Outer races 322 and 344 are each mounted in fixed relation to rotatable bushing 310.

To operate the rotary actuator or rotary coupling 354, a pinion 370 of output shaft 372 of motor 374 is rotated, and the rotary actuator 354 effects axial translation of sleeve 355. Sleeve 355 is keyed to spindle 312 to effect axial movement. While being rotationally restrained relative to spindle 312, sleeve 355 has a threaded section 362 in meshing engagement with a threaded portion 358 of coupling 354; coupling 354 has in turn, another threaded portion 360 (of differential pitch relative to 362) in mesh with threaded section 356 on spindle 312.

Accordingly, it is to be understood that upon actuating the rotary coupling 354 (upon energizing motor 374), preloading of bearings 314, 316 may be effected upon axial movement of sleeve 355 thereby axially displacing inner race 330 of bearing 316 relative to the corresponding inner race of bearing 314 relative to its corresponding outer race 344.

As will be apparent to persons skilled in the art, various modifications, adaptations and variations of the foregoing specific disclosure can be made without departing from the teachings of this invention.

We claim:

1. For supporting a shaft of a spindle, a bearing assembly comprising a pair of bearings with at least one of the bearings having an inner race and an outer race, one of the inner and outer races being mounted for rotation relative to a shaft of a spindle, the other of the inner and outer races being axially displaceable in a direction parallel to the axis of spindle rotation, a pair of race adjustment members, each adjustment member having a threaded section with a pitch different from the pitch of the threaded section of the other adjustment member, a rotatable preload actuator having differential thread portions meshingly engageable with the thread sections of the race adjustment members for adjusting the axial position of said other of the inner and outer bearing races relative to said one thereof, thereby to selectively vary the loading of the bearing, an adjustment control including a bearing load sensing device for determining actual bearing load, and drive means for rotating the preload actuator to control actual bearing load under running conditions by effecting axial positioning of said other of the inner and outer bearing races relative to said one thereof.

2. The bearing assembly of claim 1 wherein the adjustment control further includes indicating means operable in response to application of said axial force for indicating applied bearing loading.

3. The bearing assembly of claim 1 wherein the adjustment control further includes selectively operative signal means responsive to the sensing device for indicating that an actual applied bearing loading exceeds a maximum bearing loading limit.

4. The bearing assembly of claim 1 wherein the adjustment control further includes an indicator operable under running conditions to provide a continuous monitor of applied bearing loading.

5. The bearing assembly of claim 1 wherein the race adjustment members comprise a pair of non-rotatable annular members in coaxially surrounding relation to the spindle axis, the annular members each having thereon said threaded section of a pitch different from the pitch of the threaded section of the other annular member, at least one of the annular members having an abutment shoulder in confronting engagement with an axial end of said other of the inner and outer races, and wherein the preload actuator includes a rotary coupling having said differential thread portions formed thereon and meshingly engaging the threaded sections of the annular members for adjustably varying the axial positioning of said other of the inner and outer bearing races.

6. The bearing assembly of claim 1 wherein the adjustment control includes comparator means for comparing a desired preload with actual bearing load as determined by the sensing device, and wherein an output from said comparator means is connected to said drive means for rotating the preload actuator in accordance with a differential between said desired preload and said actual bearing load.

7. The bearing assembly of claim 1 wherein the bearing comprises an angular contact ball bearing.

8. The bearing assembly of claim 1 wherein the bearing comprises a tapered roller bearing.

9. The bearing assembly of claim 1 wherein the inner race is mounted for rotation with the shaft of the spindle, wherein the outer race is relatively displaceable in a direction parallel to the axis of spindle rotation, and wherein the adjustment of the relative axial position of the outer bearing race relative to the inner bearing race serves to selectively vary the loading of the bearing.

10. The bearing assembly of claim 1 wherein the outer race is mounted for rotation relative to the spindle which is fixed, wherein the inner race is relatively displaceable in a direction parallel to the axis of spindle rotation, and wherein the adjustment of the relative axial position of the inner bearing race relative to the outer bearing race serves to selectively vary the loading of the bearing.

* * * * *